United States Patent [19]

Parker

[11] Patent Number: 5,442,994
[45] Date of Patent: Aug. 22, 1995

[54] QUICK THAWING DEHUMIDIFICATION PROOF BOX

[75] Inventor: Thomas W. Parker, Staten Island, N.Y.

[73] Assignee: M. Raubvogel Co., Inc., Syosset, N.Y.

[21] Appl. No.: 22,669

[22] Filed: Mar. 1, 1993

[51] Int. Cl.⁶ ............................................. A21C 13/00
[52] U.S. Cl. ........................................ 99/468; 99/470; 99/474; 99/476; 99/483
[58] Field of Search ................. 99/483, 468, 470, 476, 99/474; 219/401, 273, 333, 362; 34/151

[56] References Cited

U.S. PATENT DOCUMENTS

| | | | |
|---|---|---|---|
| H229 | 3/1987 | Phillips . | |
| 3,189,460 | 6/1965 | Smith | 99/476 |
| 3,377,941 | 4/1968 | Jaremus | 99/468 |
| 4,066,011 | 1/1978 | Ballentine . | |
| 4,187,325 | 2/1988 | Tyree, Jr. | 99/470 |
| 4,602,503 | 6/1986 | Hile et al. . | |
| 4,635,540 | 1/1987 | Dowds . | |
| 4,667,591 | 5/1987 | Garbar et al. . | |
| 4,674,402 | 6/1987 | Raufeisen . | |
| 4,700,887 | 10/1987 | Timmons . | |
| 4,722,268 | 2/1988 | Rightley | 99/468 |
| 4,729,246 | 3/1988 | Melgaard et al. . | |
| 4,750,545 | 6/1988 | Hile et al. . | |
| 4,829,891 | 5/1989 | Satake | 99/483 |
| 4,830,278 | 5/1989 | Kohmura et al. | 99/468 |
| 4,920,948 | 5/1990 | Koether et al. | 99/468 |
| 4,939,987 | 7/1990 | Smith . | |
| 5,026,567 | 6/1991 | Manser et al. | 99/468 |
| 5,083,505 | 1/1992 | Kohlstrung et al. | 99/468 |
| 5,201,364 | 4/1993 | Tippmann et al. | 99/468 |
| 5,279,212 | 1/1994 | Coupe | 99/470 |

*Primary Examiner*—David A. Scherbel
*Assistant Examiner*—James F. Hook
*Attorney, Agent, or Firm*—Amster, Rothstein & Ebenstein

[57] ABSTRACT

An apparatus and method for thawing and proofing delicate, moisture reactive frozen food products sensitive to high humidity conditions, the apparatus comprising a cabinet for storing the food products within a chamber, the cabinet having a ducted housing containing a climate control system comprising a circulating system for transferring a volume of ducted air through a heater for raising the ambient temperature, an evaporator coil for lowering the air temperature and relative humidity, and a humidifier for increasing the relative humidity during proofing, the climate control system further including a programmable microprocessor controller communicating with the components, and temperature and humidity sensors within the cabinet chamber, to maintain desired combinations of time, temperature and humidity which may be programmed by the operator.

10 Claims, 2 Drawing Sheets

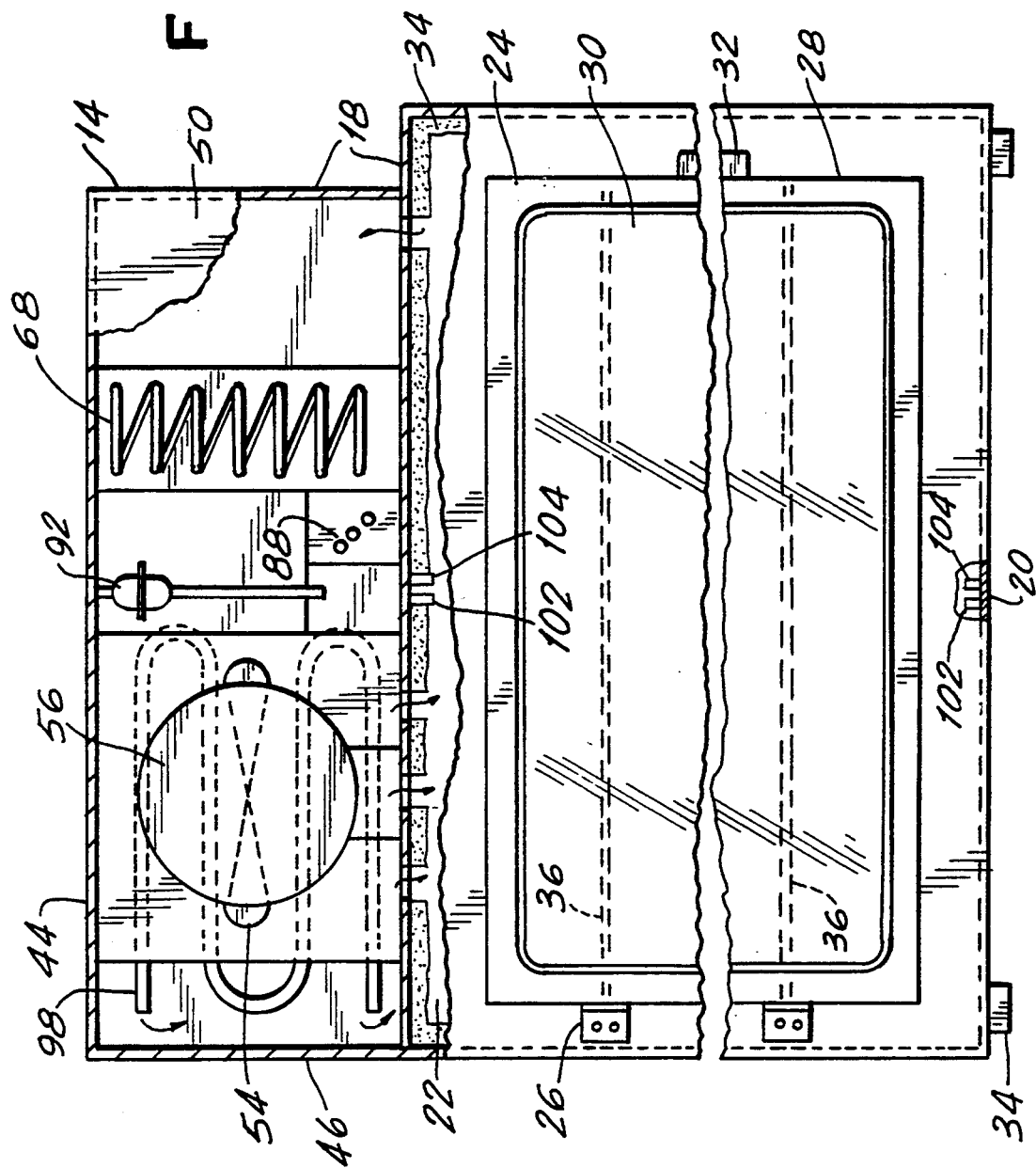

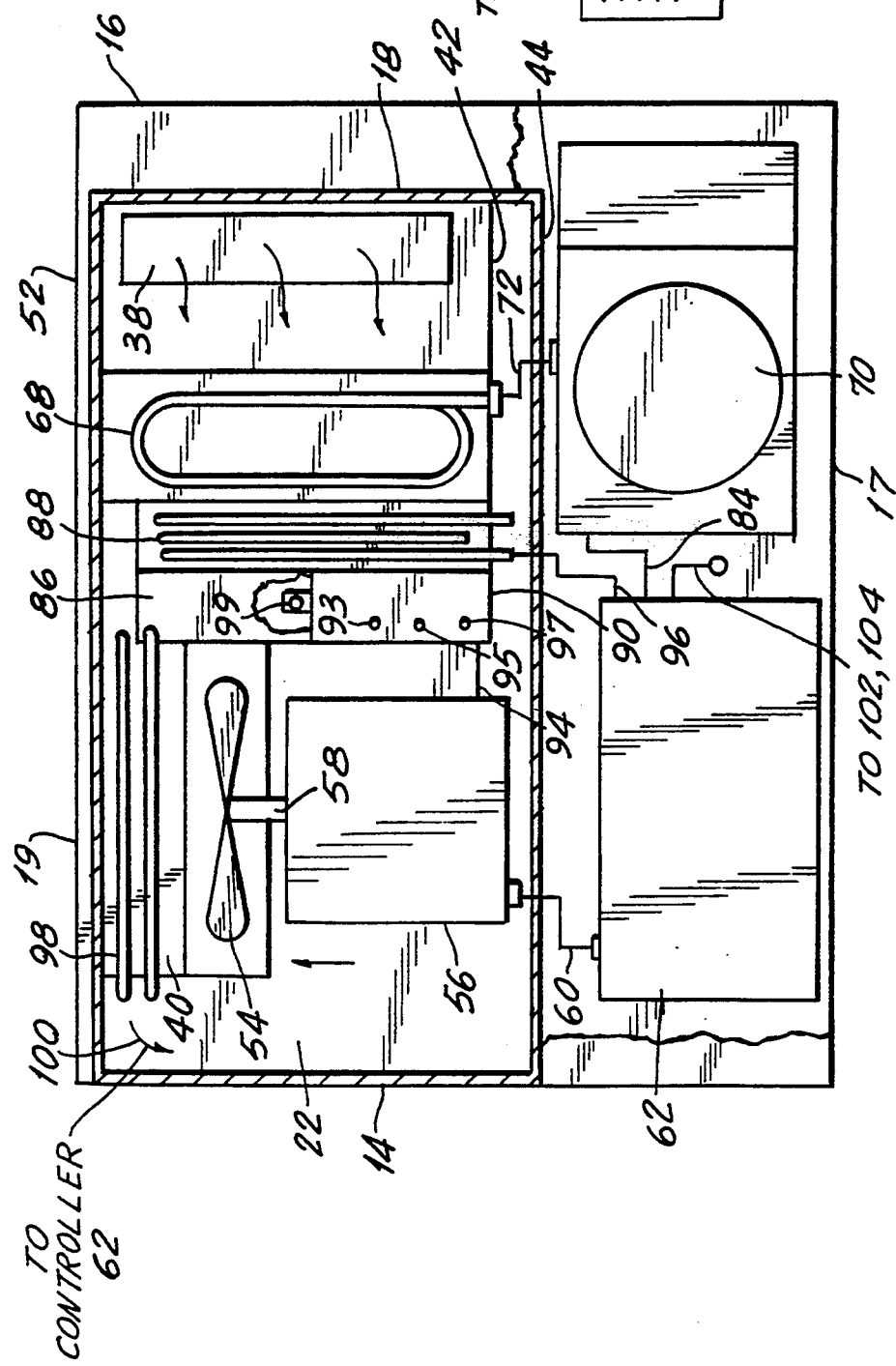
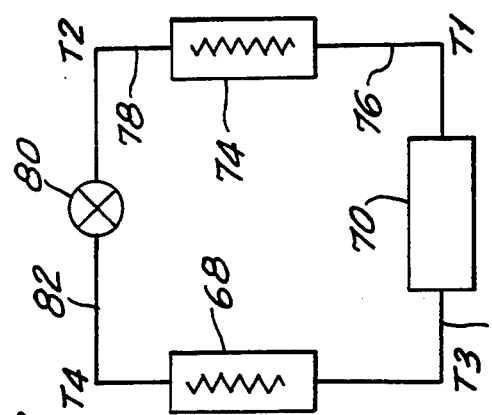

QUICK THAWING DEHUMIDIFICATION PROOF BOX

BACKGROUND OF THE INVENTION

1. Field of the Invention

This invention relates generally to a baking apparatus, and more particularly, to an apparatus for thawing and proofing delicate, moisture reactive frozen food products with evaporative dehumidification.

2. Description of the Prior Art

A bakery usually prepares dough for baked products well before they are actually baked in an oven. To insure freshness, these products in the "raw dough stage" are usually frozen for some period of time. Prior to placement in the oven, the dough must be thawed and/or "proofed." Because it is desirable to cure the dough immediately prior to baking, cooling the dough to retard the cure or proof is usually performed after thawing. When the dough is ready for baking, it is proofed in a proofing device by selectively adding heat and humidity, thereby causing it to rise. The quality of proofing is dependent upon time, temperature and humidity. Conventional proofing devices are plagued by excessive condensation buildup on the goods. This occurs because the humidity rises uncontrollably during the process, and has a particularly negative effect on delicate moisture reactive foods such as doughnuts and pastries which are made with finely ground flour. The use of finely ground flour in baking results in a higher quality product. However, such product is unable to absorb the quantities of moisture generated during conventional proofing without suffering from some degradation in quality. As a result, it was previously necessary to use coarser flours with better moisture retention properties, albeit at the expense of product quality.

Designers of proofing devices have addressed this problem by attempting to regulate the amount of condensation generated during proofing by controlling the humidity level within the device. An example is found in U.S. Pat. No. 4,674,402, issued to Raufeisen. The patent teaches a proofing apparatus wherein humidity control is maintained by circulating proofing air into a chamber from a proofing air heater downwardly to a boiler where it is humidified and then circulated upwardly over the goods. In this manner, it is hoped that excessive humidity levels and resultant condensation within the system is avoided.

Other inventions directed to proofing dough are disclosed in U.S. Pat. Nos. 4,066,011, issued to Ballentine, 4,635,540, issued to Dowds, 4,667,591, issued to Garbar, et al., and 4,939,987 issued to Smith.

Finally, U.S. SIR H229 issued to Phillips, teaches a testing chamber for simulating outdoor environmental conditions by controlling the temperature and humidity therein through associated heating, cooling, humidifying and dehumidifying equipment.

SUMMARY OF THE INVENTION

The present invention is directed to a thawing and proofing apparatus for baked products, and a method for performing same.

The apparatus is generally comprised of a cabinet for storing the products which has a circulating system for transferring ducted air therethrough; a heater for increasing the ambient air temperature; a humidifier for increasing the relative humidity; an evaporative refrigeration system for cooling and dehumidification, and a microprocessor controller for regulating the components. The hardware is preferably disposed in a housing above the cabinet. Ducting is provided to direct a volume of modified air downwardly into the cabinet interior and receive return air from same. Communicating with the ducting in the area nearest the return air opening, is an evaporative system for cooling and dehumidification.

The evaporative system is of the refrigeration type, comprising an evaporator coil disposed within the ducting which, through plumbing fluidly communicates refrigerant with a compressor, condenser and expansion valve as is well-known in the art. Air returning from the cabinet passes through the evaporator coil which, when activated, cools and dehumidifies the air by lowering the air temperature through heat transfer. This causes condensation on the coil surface which may be drained out of the device, and thereby lowers the relative humidity of the ducted air.

The air is next ducted through a humidifier for increasing the relative humidity within the cabinet during the proofing stage. The humidifier may be a common type where a water chamber fluidly communicating with the ducting, has an electrical resistance heating element disposed therein for evaporating a given quantity of water to attain a specified relative humidity. Excessive humidity levels are avoided by passing return air from the cabinet through the evaporator coil to lower the relative humidity of return air flowing through the humidifier prior to humidification, thus avoiding further regeneration of air at a higher than desired humidity level.

Following humidification, the air is circulated by means of a standard electrically driven fan or the like. The air is routed through a heater which may be selectively activated during the thawing and proofing stages. The heater may be of the electrical resistance type, having heating elements or coils disposed in the ducting to effectuate heat transfer to the air flow just prior to its passage into the cabinet. If desired, other types of heat transfer methods may be used within the scope of the invention.

A microprocessor is provided for controlling the various components based upon programmable settings by an operator to achieve the desired temperature, humidity and time of the thawing or proofing operation in up to three timed segments containing different temperature and humidity settings. The microprocessor uses a hard logic circuit to sense temperature and humidity every second. The rest of the control logic is maintained on a non-volatile memory chip which permits the microprocessor to control the parameters manipulating the hard logic input information. The microprocessor communicates with temperature and humidity sensors within the cabinet to automatically add or remove heat or humidity as required to maintain conditions within the set parameters.

To thaw the goods, the heater is activated and warm air is circulated into the cabinet for a specified time period. To retard the cure prior to proofing, the air may be cooled by the evaporator coil as it passes therethrough. When proofing is desired, the humidifier and heater will add heat and humidity in proper proportions in response to controller commands. Excessive humidity is removed by the passage of warm and humid return air through the evaporator coil.

In accordance with the foregoing, it is an object of the present invention to provide a thawing and proofing apparatus for delicate, moisture reactive foods enabling the use of finer, less moisture absorbent flour without degradation thereof during the proofing process.

It is a further object of the invention to provide a thawing and proofing apparatus for delicate, moisture reactive foods wherein dehumidification by an evaporative refrigeration process limits the humidity level during the proofing stage.

It is yet another object, of the instant invention to provide a thawing and proofing apparatus for delicate, moisture reactive foods wherein the thawing and proofing parameters are microprocessor controlled.

It is a still further object of the invention to provide a method for thawing and proofing delicate frozen foods using dehumidification by an evaporative refrigeration process. In accordance with these and other objects which will become apparent hereinafter, the present invention will now be described with particular reference to the accompanying drawings.

BRIEF DESCRIPTION OF THE DRAWINGS

FIG. 1 is a front elevational view of the thawing and proofing apparatus;
FIG. 2 is a top plan view thereof; and
FIG. 3 is a schematic of the dehumidification system.

DETAILED DESCRIPTION OF THE PREFERRED EMBODIMENT

With reference to the several views in the drawings, there is depicted a thawing and proofing apparatus generally referred to by the reference numeral 10. Apparatus 10 is generally comprised of a cabinet 12 and climate control housing 14.

Cabinet 12 is defined by sidewalls 14 and 16, respectively, front and rear walls 17 and 19, respectively, and top and bottom walls 18 and 20, respectively, all six walls collectively defining an interior storage chamber 22. Disposed to the interior of cabinet 12, is preferably a layer of insulating material 23 to minimize heat loss to the ambient. Door 24 is hingedly connected to front wall 17 by hinge(s) 26 and comprises frame 28 and transparent cover 30. Cover 30 permits viewing of the food products during the thawing and proofing treatment to assist the baker in determining what parameters must be programmed. A latch mechanism 32 is attached to door 24 on frame 28 and adapted to engage a corresponding structure on the exterior of wall 17. A peripheral seal 34 is disposed between door frame 28 and front wall 17 to minimize heat and humidity losses at the interface thereof. Bottom wall 20 may include provisions 35 for resting on a support surface so that cabinet 12 transmits minimum vibration. Chamber 22 has means for accepting a plurality of trays or racks 36, to accommodate food products for thawing and proofing thereof prior to baking. Top wall 18 has apertures 38 and 40 defined therethrough for communicating with climate control housing 14.

Housing 14 is disposed above top wall 18 and includes internal ducting 42 to route air from chamber 22 through return aperture 38, through the air modification components, and back into interior chamber 22 through supply aperture 40. Housing 14 comprises a cover 44, sidewalls 46 and 48, respectively, and front and rear walls 50 and 52, respectively.

Modified air is circulated through supply aperture 40 by means of a fan 54 coupled to motor 56 by shaft 58. Fan 54 and motor 56 are sized such that an adequate volume of air may be directed into chamber 22 to maintain the desired temperature and humidity. Motor 56 has cable 60 electrically associated with microprocessor controller 62, which will be explained in greater detail hereinbelow. The motor output may be adjusted by the microprocessor in a conventional manner to vary the mass flow rate of air passing through fan 54.

Return air from interior chamber 22 first passes through a heat exchanger for cooling and dehumidification. The heat exchanger is preferably of the refrigerant type which includes an evaporator coil 68. As depicted in the schematic in FIG. 3, the refrigeration system is of the type well-known in the art, where compressor 70 superheats refrigerant by compressing it prior to its introduction into condenser 74 through plumbing 76. The refrigerant is cooled at constant pressure, condensed and subsequently directed through line 78 communicating with expansion valve 80 where the throttling of the refrigerant reduces its temperature. It then flows through line 82 into an evaporator coil 68 where the return air is cooled and dehumidified as heat is transferred to the refrigerant, thereby lowering the relative humidity through contact by the air of the cool surface of the coil with attendant condensation of moisture on coil 68. The vaporized refrigerant is then directed through line 72 into the inlet of compressor 70. Compressor 70 is sized in accordance with desired system parameters, and is electrically associated with controller 62 through cable 84.

After passing through coil 68, the air flows through a humidity generator 86 for humidification during proofing. Humidity generator 86 may comprise an electrical resistance heating element 88 preferably encased in an inkalloy sheath, or the like to resist corrosion, disposed within a water chamber 90 having an electrical water level controller 92 which communicates with controller 62 through cable 94. Heating element 88 communicates with controller 62 through cable 96. Generator 86 adds moisture to the air flow by evaporating a quantity of water into vapor in response to inputs from controller 62, to achieve the required humidity level within chamber 22. As a means of insuring that humidity and associated condensation within chamber 22 do not increase to the point where the fine dough food product is unable to absorb the high moisture content in the air, the refrigeration cycle which cools coil 68 may be selectively activated by controller 62 to dehumidify the return air prior to its introduction through generator 86. Electronic water level controller 92 senses water level through three stainless steel probes 93, 95 and 97. Water level controller 92 is A.C. Powered which ionizes the minerals in the water to prevent accumulation on heating element 88, resulting in greater durability. Probe 93 is the greatest in length, which prevents operation of the humidity generator 86 should the water level within water chamber 90 drop below a specified minimum level. Probe 95 is of medium length which when not grounded by water immersion, triggers a water valve 99 to refill water chamber 90. Probe 97 is shortest in length, which when grounded by sufficient water immersion, closes water valve 99;

The air temperature is raised by passing the air flow through heating element 98 similar to heating element 88, preferably encased in an inkalloy sheath or the like. Element 98 may be of the conventional electrical resistance type, communicating with controller 62 through cable 100. If desired, alternate means for raising the air temperature such as a fluidic heat exchanger, may be substituted in lieu of element 98 without departing from the scope of the invention.

Microprocessor controller 62, in addition to communicating with compressor 70, humidity generator 86 and motor 56, is electrically associated with temperature and humidity sensing elements 102 and 104, respectively, which are disposed within chamber 22. Controller 62 is programmed by the user to set desired time, temperature and humidity combinations. In this manner, the unit adds heat alone during the thawing process. Since it is undesirable to fully thaw food products unless they are immediately proofed, the cure may be retarded by cooling chamber 22 by activating compressor 70 and the associated refrigeration hardware. During proofing without dehumidification, it has been determined that 110° F. for a period of thirty minutes with an initial humidity setting of 40%, results in an increase in relative humidity in the range of 80-90% in the last ten minutes. The resulting product deterioration when fine, non-absorbent flour is used, is unacceptable. In the present invention, dehumidification is used during proofing by automatically activating the refrigeration system, causing humid return air to flow through coil 68 prior to being rehumidified by generator 86. This prevents excessive chamber condensation and maintains it within acceptable levels. Testing has demonstrated that when controller 62 enables dehumidification during proofing, humidity within chamber 22 never exceeds 52% during the last ten minutes of the process. This ability to constrain the humidity and associated condensation within such tight tolerances results in a superior dough consistency prior to baking, and ultimately, in a higher quality product.

The instant invention has been shown and described in what is considered to be the most practical and preferred embodiment. It is anticipated, however, that departures may be made therefrom and that obvious modifications will be implemented by a person skilled in the art.

I claim:

1. An apparatus for thawing and proofing delicate, moisture reactive frozen food products sensitive to high humidity conditions, comprising:
    a cabinet defining an interior storage chamber for receiving said food products;
    ducting means communicating with said cabinet for directing a volume of air therethrough, said ducting means having a first opening through which said volume of air returns from said cabinet and enters said ducting means, and a second opening through which said volume of air is introduced into said cabinet;
    circulating means for moving said volume of air through said ducting means and said cabinet;
    heat exchanger means for dehumidifying and cooling said volume of air, said heat exchanger including means for cooling said volume of air for retarding the cure of said food products after thawing and for dehumidifying and cooling said volume of air during proofing;
    compressor means for compressing refrigerant, said compressor means fluidly communicating with said heat exchanger means;
    heating means for raising the temperature of said volume of air;
    humidification means for increasing the relative humidity of said volume of air, said humidification means being disposed downstream from said heat exchanger means within said ducting means so as to humidify said volume of air after said volume of air is dehumidified by passing through said heat exchanger means;
    sensing means for measuring temperature and humidity within said cabinet chamber;
    control means, communicating with said sensing means, circulating means, compressor means, heating means, and humidification means, for programmably regulating the temperature and humidity within said storage chamber,
    whereby, said food products may be thawed by first heating said chamber by enabling said heating means and the cure of said thawed food products retarded by enabling said heat exchanger means, and whereby said food products may then be proofed by adding heat and humidity by activating said heating means and humidification means, and controlling the humidity level and associated condensation within said chamber by passing said volume of air returning from said chamber through said heat exchanger means to dehumidify and cool said volume of air returning from said chamber into said ducting means prior to humidifying and introducing said volume of air back into said cabinet, thereby preventing excessive condensation and reducing product deterioration due to excessive moisture absorption.

2. The apparatus for thawing and proofing delicate frozen food products as recited in claim 1, wherein said heat exchanger means is located so that return air from said cabinet chamber first passes therethrough.

3. The apparatus for thawing and proofing delicate frozen food products as recited in claim 2, wherein said heat exchanger means is an evaporator coil disposed within said ducting means.

4. The apparatus for thawing and proofing delicate frozen food products as recited in claim 3, wherein said humidification means are disposed adjacent said evaporator coil.

5. The apparatus for thawing and proofing delicate frozen food products as recited in claim 3, wherein said heating means are disposed downstream from said circulating means and said volume of air is heated and passes directly into said cabinet chamber.

6. The apparatus for thawing and proofing delicate frozen food products as recited in claim 3, wherein said heating means comprise an electrical resistance heating element.

7. The apparatus for thawing and proofing delicate frozen food products as recited in claim 3, wherein said humidification means comprise an electrical resistance heating element disposed in a water chamber communicating with said ducting means.

8. The apparatus for thawing and proofing delicate frozen food products as recited in claim 3, wherein said control means is a programmable microprocessor.

9. The apparatus for thawing and proofing delicate frozen food products as recited in claim 3, wherein said cabinet is insulated.

10. An apparatus for thawing and proofing delicate frozen food products sensitive to high humidity conditions, comprising:
    an insulated cabinet defining an interior storage chamber for accepting said food products;
    ducting means communicating with said cabinet for directing a volume of air therethrough, said ducting means having a first opening through which said volume of air returns from said cabinet and enters said ducting means, and a second opening through which said volume of air is introduced into said cabinet;

circulating means for moving said volume of air through said ducting means;

heat exchanger means for dehumidifying and cooling said volume of air, said heat exchanger means comprising an evaporator coil disposed within said ducting means so that return air from said cabinet chamber first passes therethrough, said heat exchanger including means for cooling said volume of air for retarding the Cure of said food products after thawing and for dehumidifying and cooling said volume of air during proofing;

compressor means for compressing refrigerant, said compressor means fluidly communicating with said evaporator coil;

heating means for raising the ambient air temperature of said volume of air, said heating means comprising an electrical heating resistance element disposed downstream from said circulating means so said heated air therefrom passes unmodified into said cabinet chamber;

humidification means for increasing the relative humidity of said volume of air during proofing, said humidification means comprising an electrical resistance heating element disposed in a water chamber communicating with said ducting means, said humidification means being disposed downstream from said heat exchanger means within said ducting means so as to humidify said volume of air after said volume of air is dehumidified by passing through said heat exchanger means;

sensing means for measuring temperature and humidity within said cabinet chamber;

control means communicating with said sensing means and said circulating means, compressor means, heating means, and humidification means, for regulating the temperature and humidity within said cabinet storage chamber, said control means comprising a programmable microprocessor, whereby, said food products may be thawed by first heating said chamber by enabling said heating means, and the cure of said thawed food products retarded by enabling said heat exchanger means, and whereby said food products may then be proofed by adding heat and humidity by activating said heating means and humidification means, and controlling the humidity level and associated condensation within said chamber by passing said volume of air returning from said chamber through said heat exchanger means to dehumidify and cool said volume of air returning from said chamber into said ducting means prior to humidifying said volume of air by said humidification means and introducing said volume of air back into said cabinet, thereby reducing product deterioration due to excessive moisture absorption.

\* \* \* \* \*